(12) United States Patent
Yamaguchi et al.

(10) Patent No.: US 9,601,958 B2
(45) Date of Patent: Mar. 21, 2017

(54) STATOR PORTION AND MOTOR

(71) Applicant: Nidec Corporation, Kyoto (JP)

(72) Inventors: Yuhei Yamaguchi, Kyoto (JP); Hisashi Fujihara, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 253 days.

(21) Appl. No.: 14/414,759

(22) PCT Filed: Oct. 17, 2013

(86) PCT No.: PCT/JP2013/006177
§ 371 (c)(1),
(2) Date: Jan. 14, 2015

(87) PCT Pub. No.: WO2014/061276
PCT Pub. Date: Apr. 24, 2014

(65) Prior Publication Data
US 2015/0188376 A1    Jul. 2, 2015

(30) Foreign Application Priority Data
Oct. 19, 2012   (JP) .................................. 2012-231626

(51) Int. Cl.
*H02K 3/52*    (2006.01)
*H02K 3/28*    (2006.01)

(52) U.S. Cl.
CPC ............... *H02K 3/28* (2013.01); *H02K 3/522* (2013.01)

(58) Field of Classification Search
CPC .. H02K 3/18; H02K 3/22; H02K 3/28; H02K 3/32; H02K 3/46; H02K 3/50; H02K 3/52; H02K 3/522; H02K 5/22
See application file for complete search history.

(56) References Cited

U.S. PATENT DOCUMENTS 7,652,402 B2 *  1/2010  Kinoshita ................ H02K 3/50
                                                  310/55
7,737,587 B2 *  6/2010  Kataoka .................. H02K 3/522
                                                  174/68.2

(Continued)

FOREIGN PATENT DOCUMENTS

JP      11-018345 A     1/1999
JP    2000-333400 A    11/2000

(Continued)

OTHER PUBLICATIONS

Official Communication issued in International Patent Application No. PCT/JP2013/006177, mailed on Jan. 7, 2014.

*Primary Examiner* — Tran Nguyen
(74) *Attorney, Agent, or Firm* — Keating & Bennett, LLP

(57) ABSTRACT

A stator portion includes a stator and a bus bar member. The stator includes three coil groups, each coil group includes two or more coils defined by a single conducting wire including a jumper wire. The bus bar member includes three first bus bars to which end portions on one side of the conducting wires of the three coil groups are connected, each of which includes an external connection terminal, a second bus bar defining a neutral point to which end portions on the other side of the conducting wires are connected, and a resin holder which retains the three first bus bars and the second bus bar. The three first bus bars and the second bus bar overlap only in a radial direction centered on the central axis or an axial direction, and the maximum number of bus bars which overlap is 2.

10 Claims, 18 Drawing Sheets

(56) References Cited

U.S. PATENT DOCUMENTS

| | | | |
|---|---|---|---|
| 8,193,677 B2 * | 6/2012 | Murakami | H02K 3/522 310/195 |
| 2003/0201688 A1 | 10/2003 | Yamamura et al. | |
| 2005/0248228 A1 * | 11/2005 | Yoneda | H02K 3/522 310/179 |
| 2012/0286593 A1 | 11/2012 | Yokogawa et al. | |

FOREIGN PATENT DOCUMENTS

| | | |
|---|---|---|
| JP | 2003-324883 A | 11/2003 |
| JP | 2005-287240 A | 10/2005 |
| WO | 2009/113520 A1 | 9/2009 |

* cited by examiner

STATOR PORTION AND MOTOR

BACKGROUND OF THE INVENTION

1. Field of the Invention

The present invention relates to a stator portion which includes a bus bar, and a motor.

2. Description of the Related Art

In the past, a motor which includes a bus bar has been known. The bus bar is a metal member and is disposed on one side of a stator with respect to the direction of a central axis in many cases. The bus bar electrically connects a conducting wire drawn out from a coil of the stator and an external device. For example, in a motor mounted in a vehicle, the bus bar connects the stator and a control device such as an electronic control unit (ECU). In the motor mounted in a vehicle, high reliability, such as prevention of short circuits due to vibration, is required. The reliability of the motor is improved by providing the bus bar and retaining the bus bar with a resin member.

A wire connection plate disclosed in Japanese Patent Application Publication No. 11-18345 has a plurality of arc-shaped grooves. The plurality of grooves is concentrically disposed. A conductive member for each phase and a common conductive member are fitted into the grooves. In an injection-molded terminal block disclosed in Japanese Patent Application Publication No. 2000-333400, a plurality of lead frames is concentrically stacked and supported by spacers. The lead frames and the spacers are integrally buried in a resin material. In a coil connection body shown in FIGS. 35 and 36 of Japanese Patent Application Publication No. 2003-324883, a large number of conductive members for the respective phases and a common conductive member are concentrically disposed in two rows. In a coil connection body shown in FIGS. 37 to 39 of Japanese Patent Application Publication No. 2003-324883, a large number of conductive members for the respective phases and a common conductive member are disposed in two rows to be shifted in an axial direction.

Incidentally, in the wire connection plate of Japanese Patent Application Publication No. 11-18345 and the injection-molded terminal block of Japanese Patent Application Publication No. 2000-333400, since the conductive members are arranged fourfold in a radial direction, the amount of conductive material used is large, and thus the cost or the weight of the member increases. A reduction in the size of the motor also becomes difficult. In the coil connection body of Japanese Patent Application Publication No. 2003-324883, the conductive materials are arranged in two rows. However, the number of members is large, and thus productivity is reduced.

SUMMARY OF THE INVENTION

Preferred embodiments of the present invention reduce an amount of conductive material used and also reduce the number of components in a bus bar member to provide a more cost effective motor.

An exemplary stator portion according to a preferred embodiment of the present invention includes a stator of which a central axis is directed in a vertical direction, and a bus bar member disposed on an upper side of the stator. The stator includes a core back centered on the central axis, a plurality of teeth extending toward the central axis from the core back, and a plurality of coils respectively provided at the plurality of teeth. The plurality of coils are preferably arranged in three coil groups, and each coil group includes two or more coils defined by a single conducting wire which includes a jumper wire. The bus bar member includes three first bus bars to which end portions on one side of the conducting wires of the three coil groups are respectively connected and each of which includes an external connection terminal, a second bus bar defining a neutral point to which end portions on the other side of the conducting wires of the three coil groups are connected, and a resin holder which retains the three first bus bars and the second bus bar. The external connection terminals of the three first bus bars are disposed to be collected in one area in a circumferential direction centered on the central axis, the three first bus bars and the second bus bar only overlap in any one of a radial direction centered on the central axis and an axial direction, and the maximum number of bus bars which overlap is 2.

An exemplary motor according to another preferred embodiment of the present invention includes the stator portion described above, a rotating portion which is disposed inside the stator, a bearing portion supporting the rotating portion so as to be able to rotate around the central axis, and a housing retaining the stator portion on the inside.

According to preferred embodiments of the present invention, in the bus bar member, the amount of conductive material used and the number of components are significantly reduced to provide a more cost effective motor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
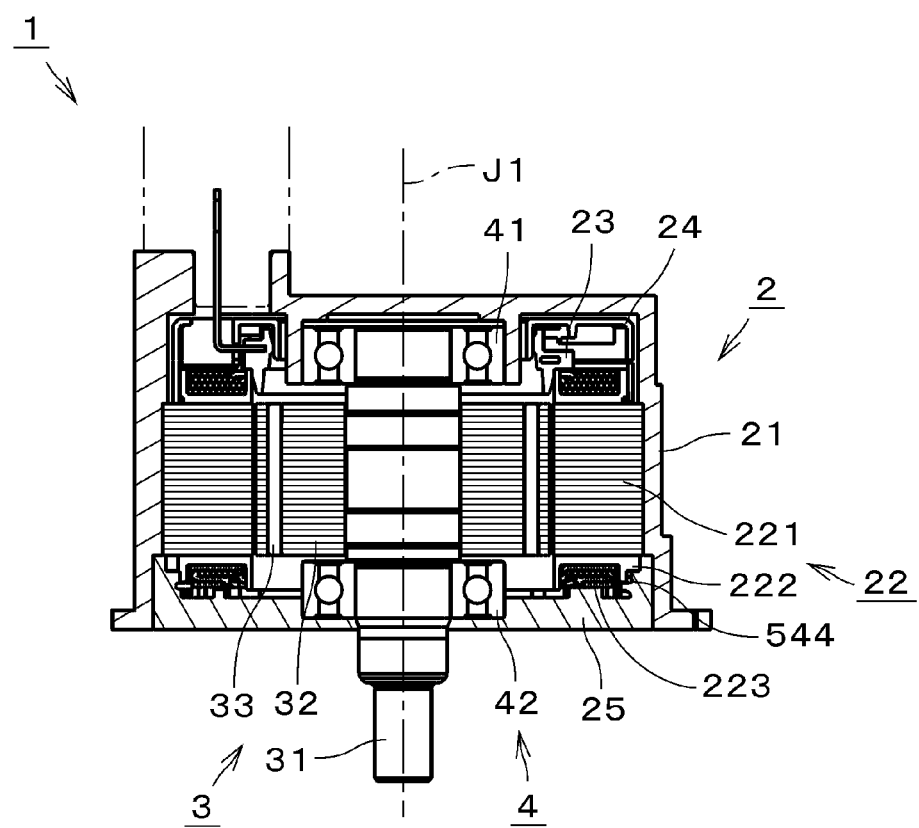
FIG. 1 is a cross-sectional view of a motor according to a preferred embodiment of the present invention.

In the following description, in a direction parallel or substantially parallel to a central axis, the upper side in FIG. 1 is simply referred to as an "upper side" and the lower side is simply referred to as a "lower side". The expressions, "the upper side" and "the lower side", need not necessarily correspond with the direction of the force of gravity. Further, a radial direction centered on the central axis is simply referred to as a "radial direction", a circumferential direction centered on the central axis is simply referred to as a "circumferential direction", and a direction parallel or substantially parallel to the central axis is simply referred to as an "axial direction".

FIG. 1 is a vertical cross-sectional view of a motor 1 according to an exemplary preferred embodiment of the invention. With respect to the details of a cross section, parallel diagonal lines are omitted. The motor 1 is preferably constructed to be mounted in a vehicle and is preferably used for, for example, an oil pump. The motor 1 is preferably an inner rotor type three-phase brushless motor. The motor 1 includes a stationary portion 2, a rotating portion 3, and a bearing portion 4. The bearing portion 4 supports the rotating portion 3 so as to be able to rotate with respect to the stationary portion 2 around a central axis J1 which is directed in a vertical direction.

The stationary portion 2 preferably includes a housing of a cylindrical or substantially cylindrical shape with a cover, a stator 22, a bus bar member 23, a cap 24, and a bracket 25. The bracket 25 blocks a lower portion of the housing 21. The stator 22 has a cylindrical or substantially cylindrical shape. The bus bar member 23 is disposed on the upper side of the stator 22. The bus bar member 23 is an annular or substantially annular terminal block. The cap 24 is substantially disposed on the upper side of the bus bar member 23 and covers the bus bar member 23.

The stator 22 preferably includes a stator core 221, an insulator 222, and a coil 223. The stator core 221 is preferably defined by, for example, laminating laminar silicon steel sheets. The housing 21 retains the stator 22 on the inside. The insulator 222 is an electrically insulating body that covers the surface of the stator core 221. In addition, the central axis J1 of the motor 1 is also a central axis of the stator 22.

The rotating portion 3 preferably includes a shaft 31, a yoke 32, and a rotor magnet 33. The rotating portion 3 is disposed inside the stator 22. The shaft 31 is disposed along the central axis J1. The yoke 32 is fixed to the outer circumferential surface of the shaft 31. The yoke 32 preferably includes a plurality of holes penetrating in the axial direction. The rotor magnets 33 are inserted in these holes. The yoke 32 is preferably defined by, for example, laminating magnetic steel sheets. Torque around the central axis J1 is generated between the stator 22 and the yoke 32 which includes the rotor magnetic 33.

The bearing portion 4 preferably includes an upper ball bearing 41 and a lower ball bearing 42. The upper ball bearing 41 is mounted at the center of an upper portion of the housing 21. The lower ball bearing 42 is mounted at the center of the bracket 25. The shaft 31 protrudes downward from the bracket 25 through an opening of the bracket 25. The shaft 31 is supported by the upper ball bearing 41 and the lower ball bearing 42 so as to be able to rotate around the central axis J1.

Figure 2:
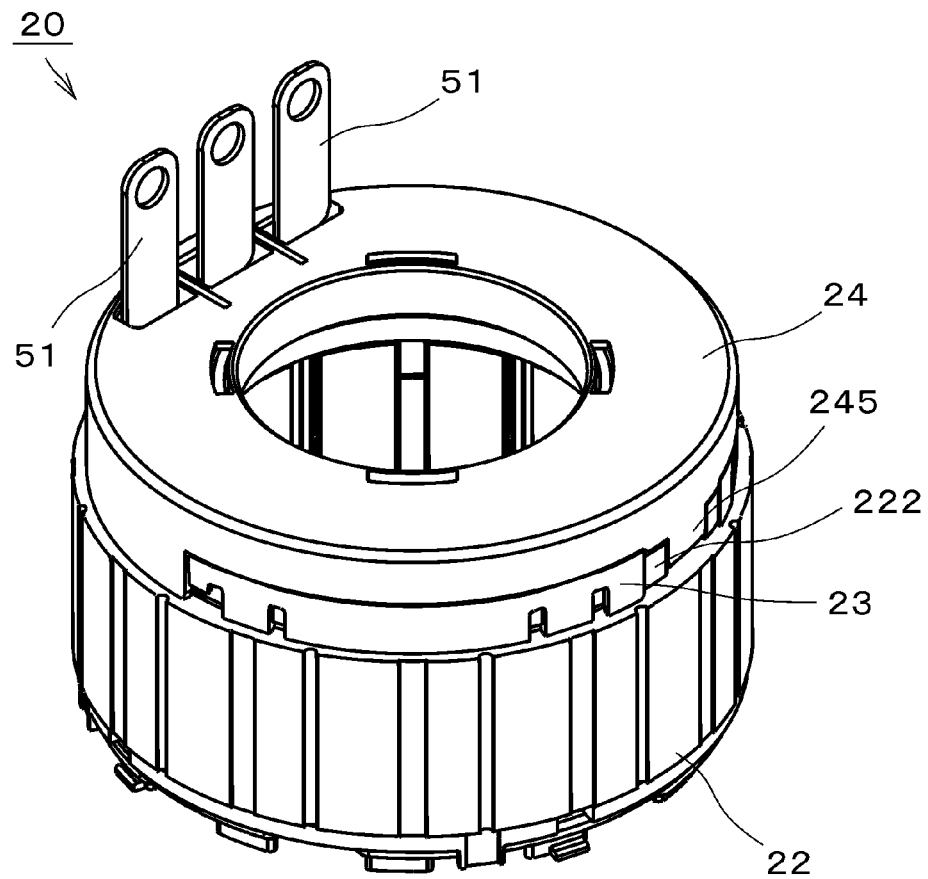
FIG. 2 is a perspective view of a stator portion according to a preferred embodiment of the present invention.
Figure 3:
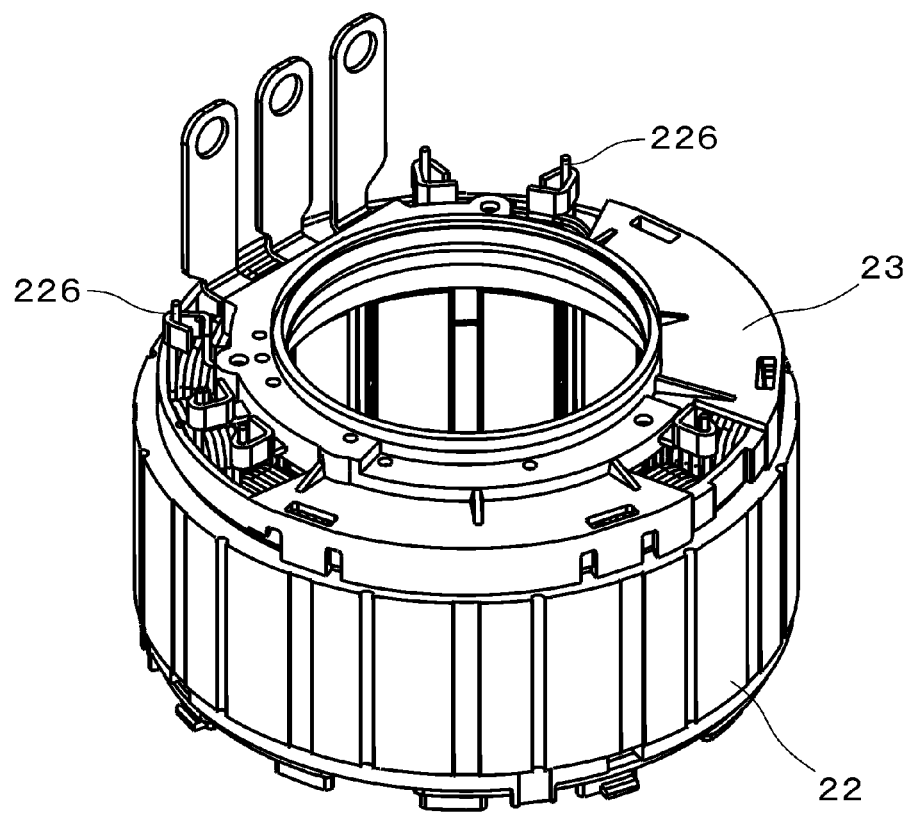
FIG. 3 is a perspective view showing a stator and a bus bar member according to a preferred embodiment of the present invention.
Figure 4:
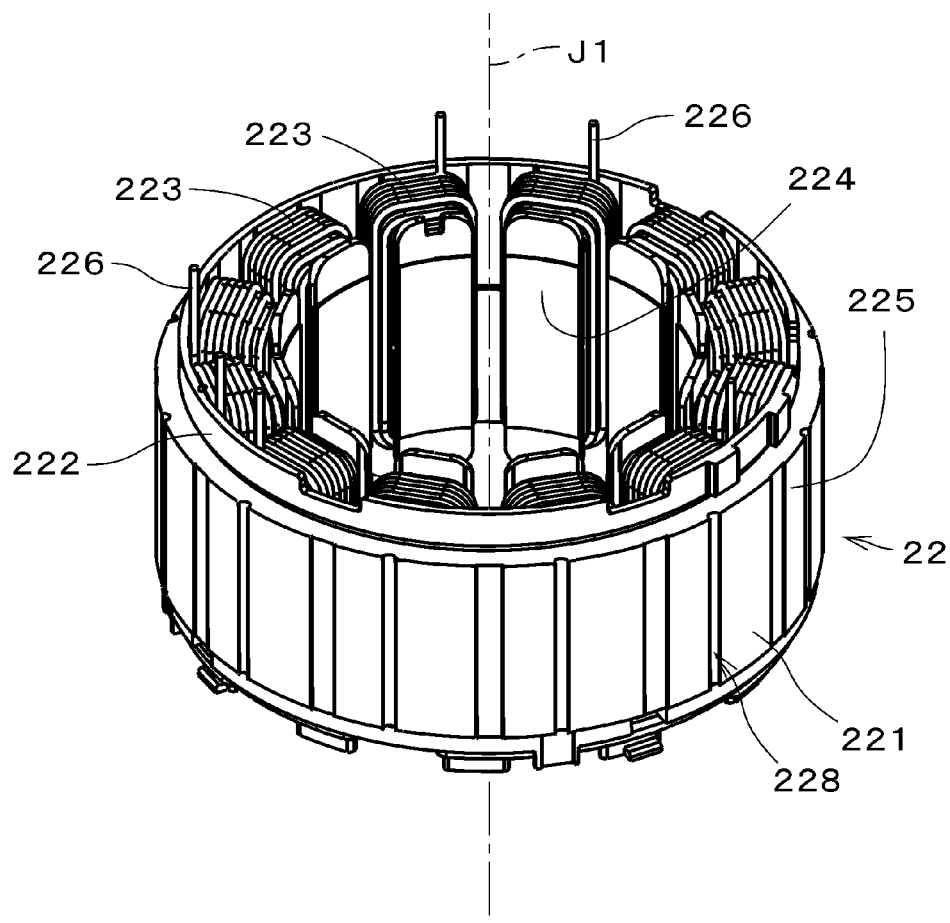
FIG. 4 is a perspective view of the stator.

FIG. 2 is a perspective view showing a stator portion 20 that is an assembly of the stator 22, the bus bar member 23, and the cap 24. FIG. 3 shows an assembly of the stator 22 and the bus bar member 23, and FIG. 4 shows only the stator 22. As shown in FIG. 4, the stator core 221 includes teeth 224 and a core back 225. The number of teeth 224 is preferably 12. The plurality of teeth 224 extends toward the central axis J1 from the core back 225. The core back 225 has an annular shape centered on the central axis J1 and connects end portions on the outer side in the radial direction of the teeth 224 in the circumferential direction. A conducting wire is wound on each of the teeth 224, preferably by concentrated winding, with the insulator 222 interposed therebetween, such that the coil 223 is provided.

In a state before the bus bar member 23 is mounted on the stator 22, an end portion 226 of the conducting wire extends upward straight or approximately straight from between the teeth 224. As shown in FIG. 3, if the bus bar member 23 is mounted on the stator 22, the end portion 226 is inserted into a terminal of the bus bar member 23. The terminal is preferably crimped and joined to the conducting wire by welding such as, for example, fusing welding, such that the bus bar member 23 and the stator are electrically connected. Instead of the fusing welding, resistance welding, TIG welding, soldering, or the like may alternatively be used.

Figure 5:
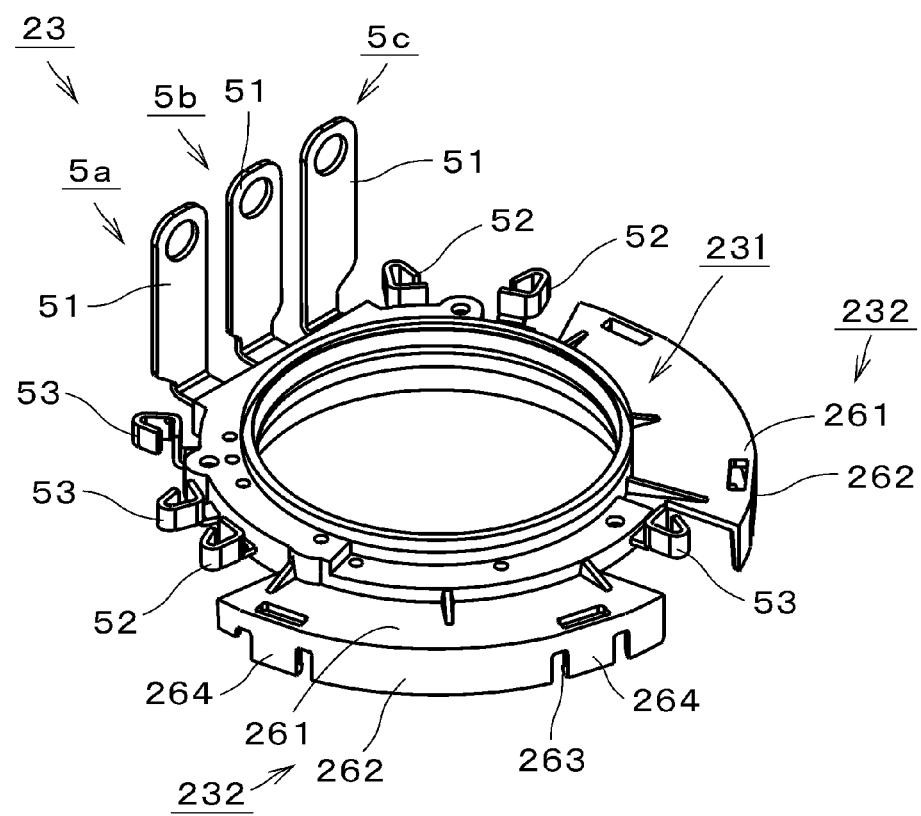
FIG. 5 is a perspective view of the bus bar member.
Figure 6A:
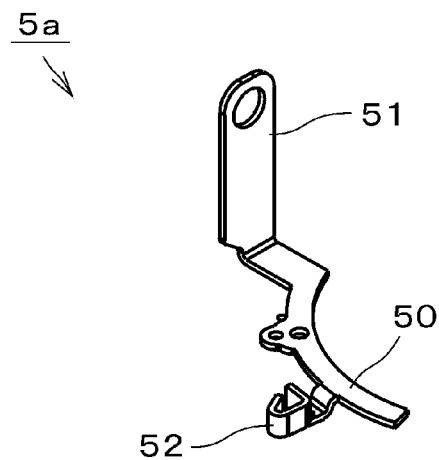
FIG. 6A is a perspective view of a first bus bar according to a preferred embodiment of the present invention.
Figure 6B:
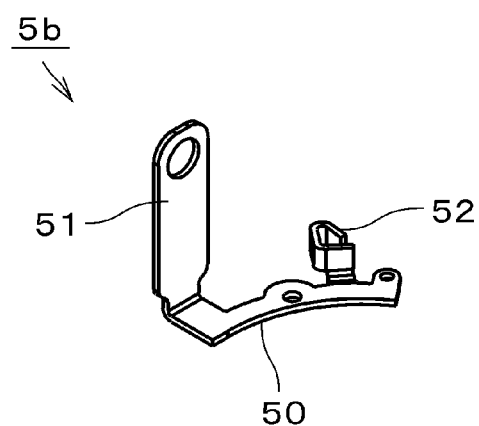
FIG. 6B is a perspective view of a first bus bar according to a preferred embodiment of the present invention.
Figure 6C:
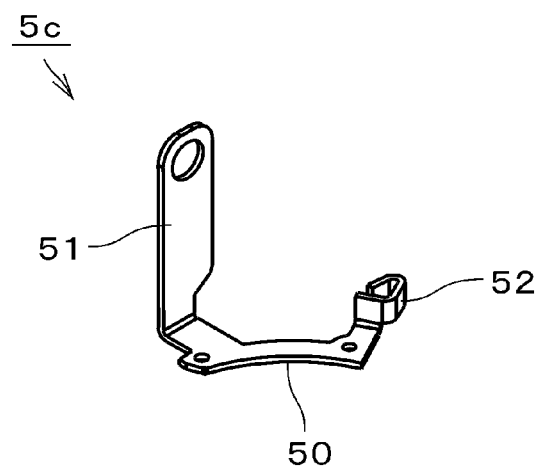
FIG. 6C is a perspective view of a first bus bar according to a preferred embodiment of the present invention.
Figure 6D:
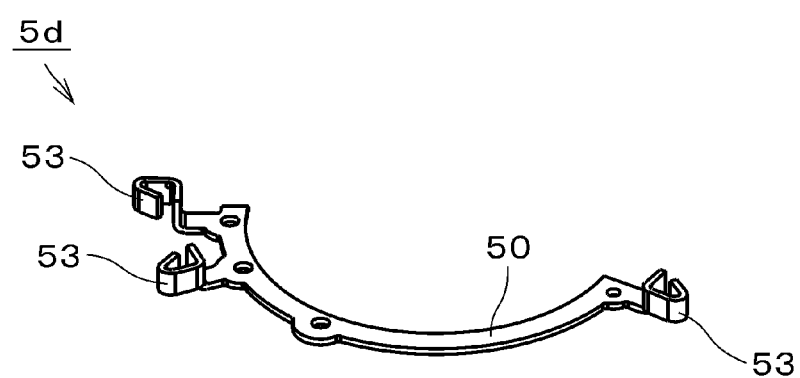
FIG. 6D is a perspective view of a second bus bar according to a preferred embodiment of the present invention.

FIG. 5 is a perspective view of the bus bar member 23. The bus bar member 23 includes a resin holder 231 and four bus bars. The resin holder 231 retains the four bus bars. The resin holder 231 has an annular shape and is disposed around the bus bars by insert molding. FIGS. 6A to 6C are perspective views of bus bars for the respective phases. FIG. 6D is a perspective view of a common bus bar for a neutral point. Hereinafter, the bus bar for each phase is referred to as a "first bus bar" and the common bus bar is referred to as a "second bus bar". A star connection of a plurality of coils 223 is preferably defined by these bus bars.

Three first bus bars 5a, 5b, and 5c are respectively for a U phase, a V phase, and a W phase. Each of the first bus bars 5a, 5b, and 5c includes a single external connection terminal 51 and a single internal connection terminal 52. A second bus bar 5s includes three internal connection terminals 53. As shown in FIG. 5, the external connection terminal 51 extends upward. The internal connection terminals 52 and 53 protrude radially outward from the resin holder 231. Each of the internal connection terminals 52 and 53 preferably has a triangular or substantially triangular shape when viewed in a plan view.

One side of the triangle of each of the internal connection terminals 52 and 53 is connected to a support portion protruding from the resin holder 231. A gap is present between one side of the internal connection terminal, which is connected to the support portion, and another side. The gap is opened toward the other circumferentially adjacent internal connection terminal. That is, in a case where two internal connection terminals are closely arranged, the gaps of the respective internal connection terminals face each other in the circumferential direction. Welding is performed at a single side which does not correspond to the gap, rather than an apex where the gap is formed, in one side of the triangle of each of the internal connection terminals 52 and 53. For this reason, by disposing the internal connection terminal in this manner, it is possible to separate welding positions from each other in the circumferential direction, and thus it is possible to improve the workability of welding.

A portion other than the connection terminal of each bus bar has a strip shape perpendicular or substantially perpendicular to the central axis J1 and an arc shape centered on the central axis J1. Hereinafter, the arc-shaped portion of the bus bar is referred to as a "bus bar main body 50". The external connection terminal 51 protrudes upward by bending a portion upward extending radially outward from the bus bar main body 50. In this way, the bus bar member 23 is prevented from becoming overly large in the radial direction. Each of the internal connection terminals 52 and 53 is preferably defined by bending a portion upward which protrudes in an L-shape from the bus bar main body 50 and then bending a portion in a substantially triangular shape which extends laterally in a strip shape.

As shown in FIG. 5, the external connection terminals of the three first bus bars 5a, 5b, and 5c are preferably disposed to be collected in one area in the circumferential direction. The bus bar main bodies 50 of the three first bus bars 5a, 5b, and 5c and the second bus bar 5d overlap in only the axial direction in the resin holder 231. Of course, the bus bars are separated from each other in the axial direction to be electrically isolated from one another. The bus bar main bodies 50 of the first bus bars 5b and 5c extend to the opposite side to the bus bar main body 50 of the first bus bar 5a in the circumferential direction.

The bus bar member 23 preferably includes an enlarged portion 232 in a range in the circumferential direction in which the internal connection terminals 52 and 53 are not present. The enlarged portion 232 includes a fan-shaped portion 261 and a suspended portion 262. The fan-shaped portion 261 extends radially outward in an approximate fan shape from the portion of the resin holder 231, which covers the bus bars. The suspended portion 262 has a partial cylindrical or substantially-cylindrical shape and extends downward from an outer edge portion of the fan-shaped portion 261.

As described previously, since the conducting wires from the coils 223 are drawn upward in an approximately straight manner, the internal connection terminals 52 and 53 are located between adjacent teeth 224 in the circumferential direction. Preferably, the internal connection terminals 52 and 53 are located in a range of (±½) of an angle pitch of the teeth 224 on both sides in the circumferential direction from the center of a slot. The end portion of a single conducting wire is connected to a single internal connection terminal. In this way, routing of a drawing-out wire is not required. In addition, the above-described angle pitch of the teeth 224 refers to an angle between the center lines extending in the radial direction of two adjacent teeth 224.

Figure 7:
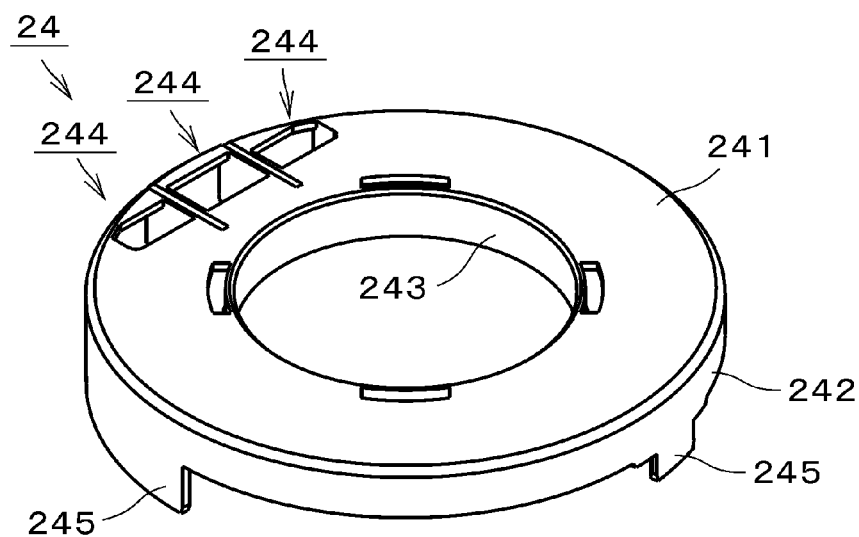
FIG. 7 is a perspective view of a cap according to a preferred embodiment of the present invention.

FIG. 7 is a perspective view of the cap 24. The cap 24 preferably includes a canopy portion 241, an outer side portion 242, and an inner side portion 243. The canopy portion 241 has a plate shape and has an annular shape. The outer side portion 242 has a cylindrical or substantially cylindrical shape and extends downward from an outer edge portion of the canopy portion 241. The inner side portion 243 has a cylindrical or substantially cylindrical shape and extends downward from an inner edge portion of the canopy portion 241. The canopy portion 241 includes through-holes 244 into which the three external connection terminals 51 are inserted.

Figure 8:
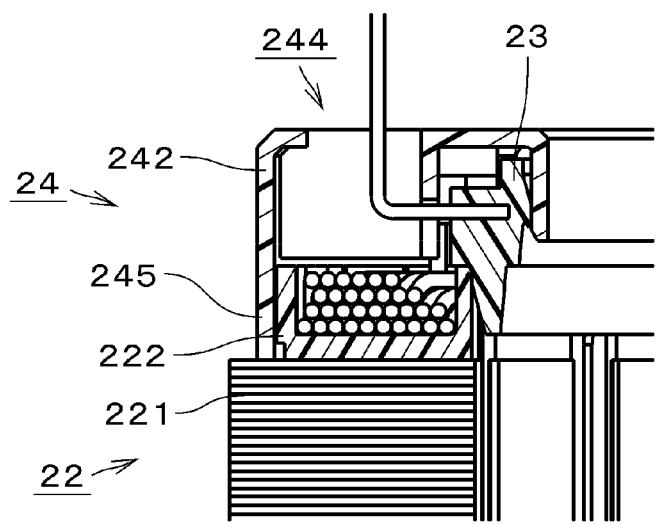
FIG. 8 is a cross-sectional view of the stator portion.

FIG. 8 is a vertical cross-sectional view of the stator portion 20 in the vicinity of the through-hole 244. As shown in FIGS. 7 and 8, the outer side portion 242 of the cap 24 preferably includes a plurality of leg portions 245 which comes into contact with the stator 22 from above. A width is various in the circumferential direction in which the leg portion 245 is present. In a range in the circumferential direction in which the leg portion 245 is present, the enlarged portion 232 of the bus bar member 23 is not present and the internal connection terminals 52 and 53 are present. The leg portion 245 covers the outer circumferential surface of the insulator 222 at the upper side of the stator core 221. As shown in FIG. 2, the leg portion 245 farthest from at least the external connection terminal 51, among the plurality of leg portions 245, also defines and functions as a rotation stop of the bus bar member 23 by coming into contact with the insulator 222 in the circumferential direction.

Figure 9:
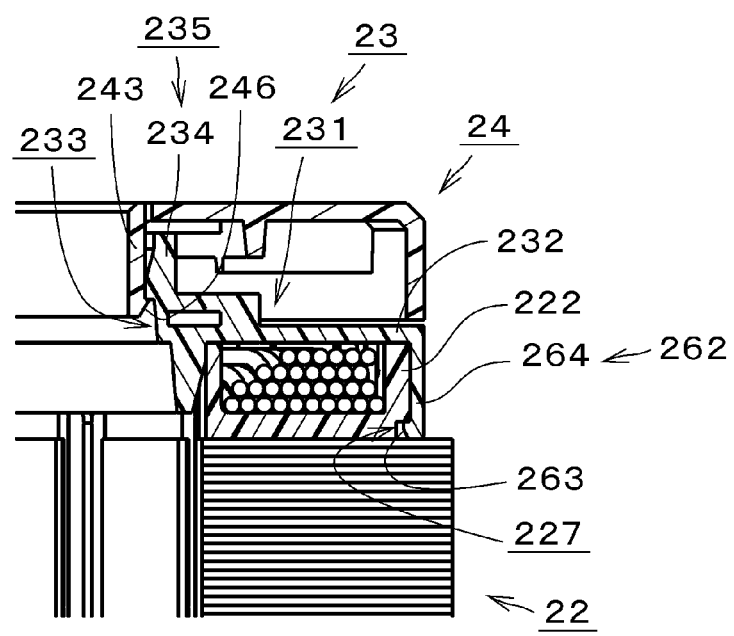
FIG. 9 is a cross-sectional view of the stator portion.

FIG. 9 is a vertical cross-sectional view of the stator portion 20 at a position where the leg portion 245 is not present and the enlarged portion 232 is present. The insulator 222 preferably includes a groove 227 extending in the circumferential direction, above the stator core 221. The groove 227 is recessed radially inward. As shown in FIG. 5, a lower end of a downward protruding portion 264 of the suspended portion 262 of the enlarged portion 232 preferably includes a projection 263 which protrudes radially inward. Hereinafter, the portion 264 is referred to as a "first snap-fit portion". As shown in FIG. 9, the projection 263 is fitted into the groove 227, such that the bus bar member 23 is fixed onto the stator 22.

At the time of assembly, the bus bar member 23 is pressed toward the insulator 222 from above. In this way, the projection 263 comes into contact with the outer circumferential surface of the insulator 222, such that the first snap-fit portion 264 bends radially outward. Thereafter, the projection 263 is fitted into the groove 227 by using the restoring force of the first snap-fit portion 264. In this manner, the first snap-fit portion 264 protrudes downward at an outer peripheral portion of the resin holder 231 and is engaged with the stator 22.

An inner peripheral portion of the resin holder 231 includes an upward protruding portion 234 which protrudes upward in a tubular shape. The inner circumferential surface of the upward protruding portion 234 is inclined downward so as to face radially inward. The inner peripheral portion of the resin holder 231 preferably includes a concave portion 233 recessed downward and radially outward. The concave portion 233 is present over the entire periphery. The inner side portion 243 of the cap 24 includes a convex portion 246 which slightly protrudes radially outward, at a lower end thereof. The convex portion 246 is present at a plurality of locations along the circumferential direction. The convex portions 246 are fitted in the concave portion 233, such that the cap 24 is fixed onto the bus bar member 23.

At the time of assembly, the cap 24 is preferably pressed toward the bus bar member 23 from above. In this way, the convex portion 246 comes into contact with the upward protruding portion 234 of the resin holder 231, such that the inner side portion 243 slightly bends radially inward and the upward protruding portion 234 slightly bends radially outward. Thereafter, the convex portions 246 are fitted in the concave portion 233 by using the restoring forces of the inner side portion 243 and the upward protruding portion 234. In this manner, the upward protruding portion 234 and the concave portion 233 which the inner peripheral portion of the resin holder 231 includes, define and function as a second snap-fit portion 235 which is engaged with the cap 24.

The first snap-fit portion 264 is provided at the outer peripheral portion of the resin holder 231 and the second snap-fit portion 235 is provided at the inner peripheral portion of the resin holder 231. In this way, the stress concentration in the resin holder 231 is further reduced as compared to a case where a snap-fit portion is provided at only one of the outer peripheral portion and the inner peripheral portion of the resin holder 231.

Figure 10A:
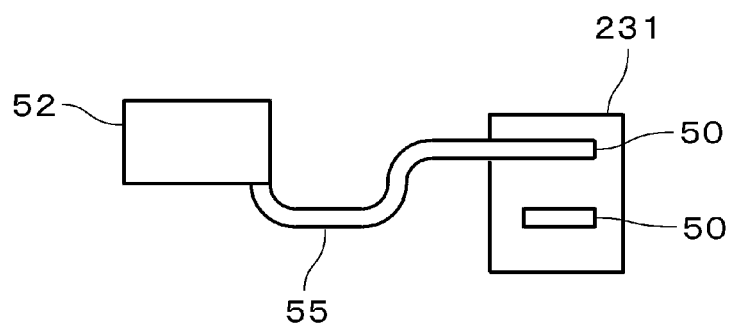
FIG. 10A is a view showing an internal connection terminal according to a preferred embodiment of the present invention.
Figure 10B:
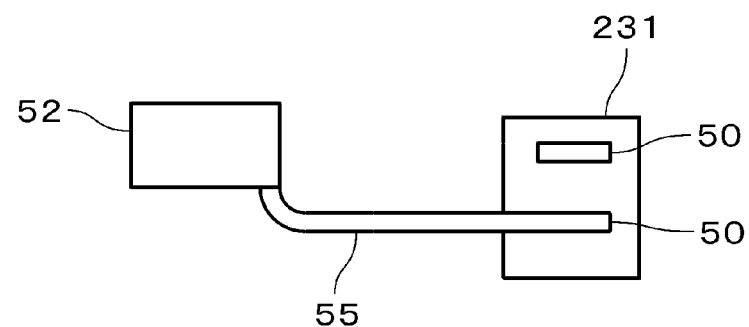
FIG. 10B is a view showing an internal connection terminal according to a preferred embodiment of the present invention.

FIG. 10A is a view showing the bus bar main body 50 which is located on the upper side in the axial direction, the internal connection terminal 52, and a support portion 55 in a simplified manner. The support portion 55 connects the bus bar main body 50 and the internal connection terminal 52 and supports the internal connection terminal 52. FIG. 10B is a view showing the bus bar main body 50 which is located on the lower side in the axial direction, the internal connection terminal 52, and the support portion 55 in a simplified manner. Either internal connection terminal may be the internal connection terminal 52 of the first bus bar or the internal connection terminal 53 of the second bus bar 5d. However, for convenience of description, reference numeral 52 is given thereto.

In the three first bus bars 5a, 5b, and 5c and the second bus bar 5d, the support portions 55 extend radially outward from the bus bar main body 50 and reach the internal connection terminals 52 and 53. As shown in FIG. 10A, the support portion 55 of the bus bar on the upper side is one time directed downward on the way from the bus bar main body 50 to the internal connection terminal 52 and then protrudes radially outward. In the bus bar on the lower side shown in FIG. 10B, the support portion 55 is directed radially outward straight. The internal connection terminals 52 of the upper and lower bus bars are located at the same axial position. Of course, the axial positions of the internal connection terminals of the upper and lower bus bars need not coincide with each other.

Even if the support portion 55 of the bus bar on the upper side is bent downward to the same axial position as the support portion 55 of the bus bar on the lower side, the bus bar member 23 does not become overly large in the axial direction. Therefore, an increase in the axial height of the motor 1 due to the internal connection terminal 52 of the bus bar on the upper side being located above at a location higher than necessary is prevented by bending the support portion 55 of the bus bar on the upper side.

Figure 11:
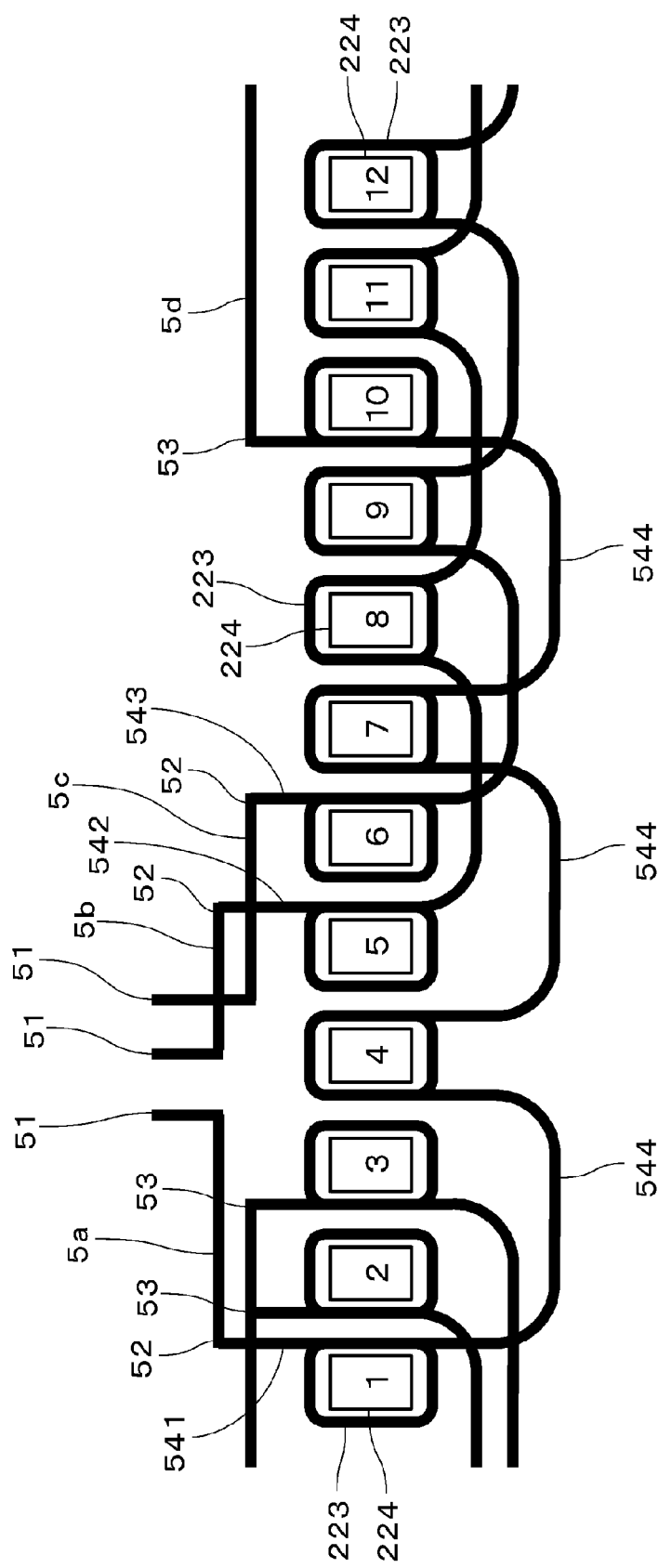
FIG. 11 is a view showing the connection relationship between the bus bar and a coil according to a preferred embodiment of the present invention.
Figure 12:
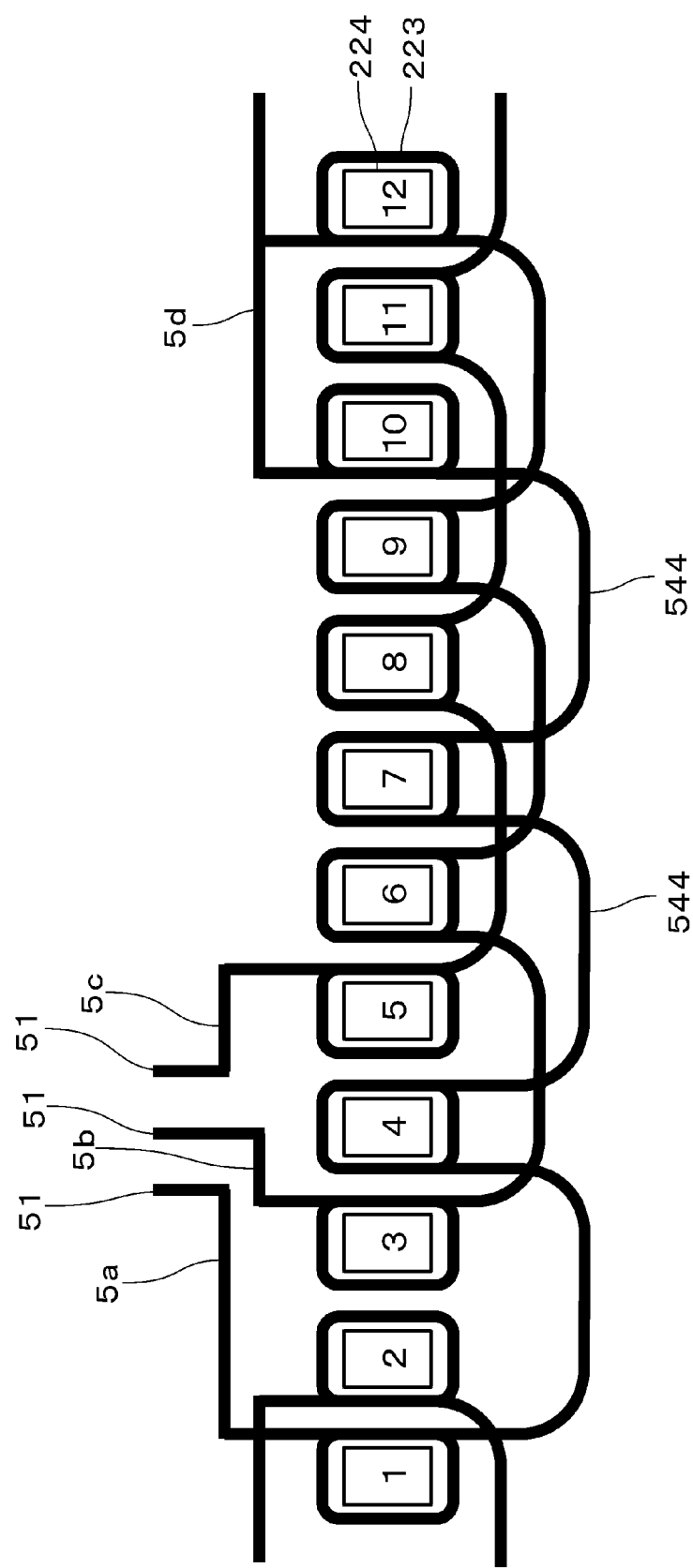
FIG. 12 is a view showing the connection relationship between the bus bar and the coil.
Figure 13:
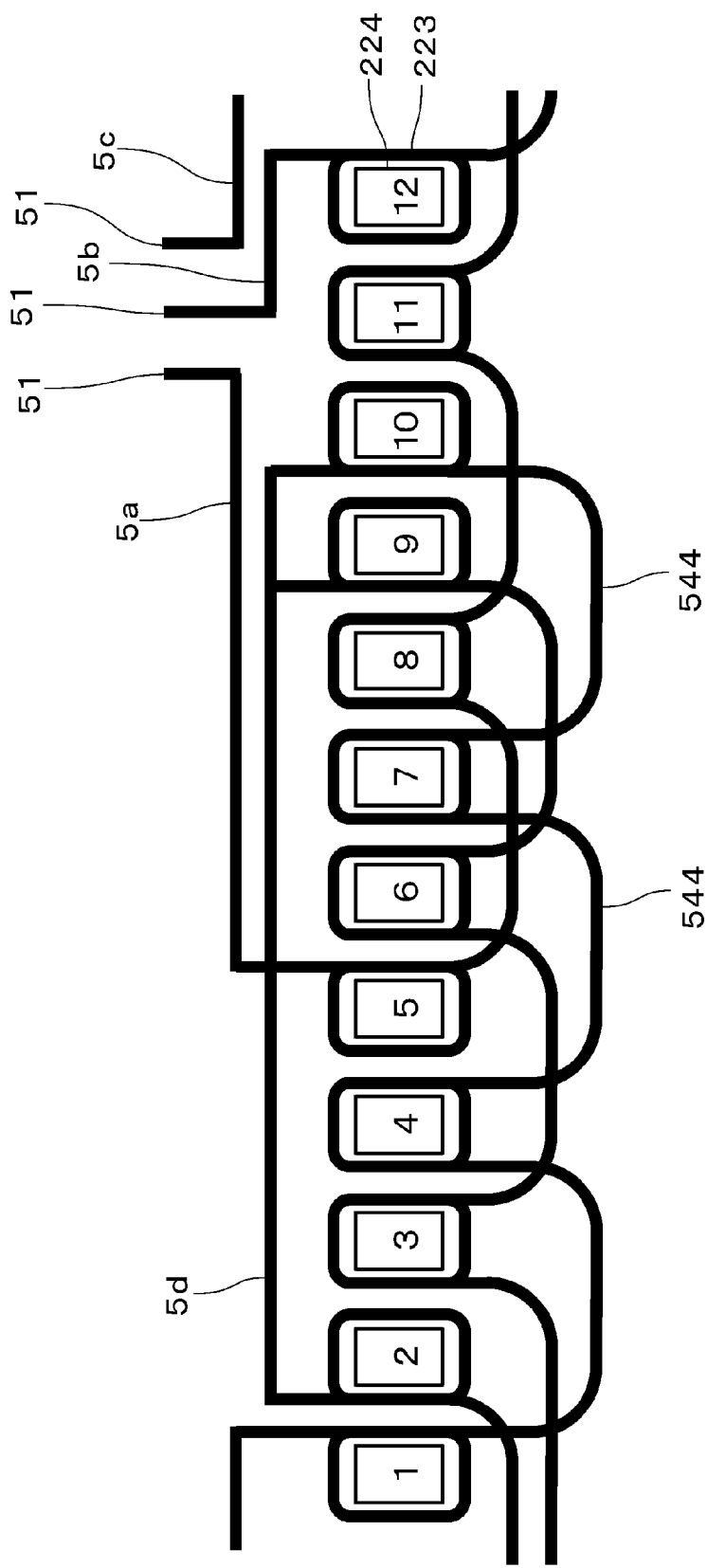
FIG. 13 is a view showing the connection relationship between the bus bar and the coil.
Figure 14:
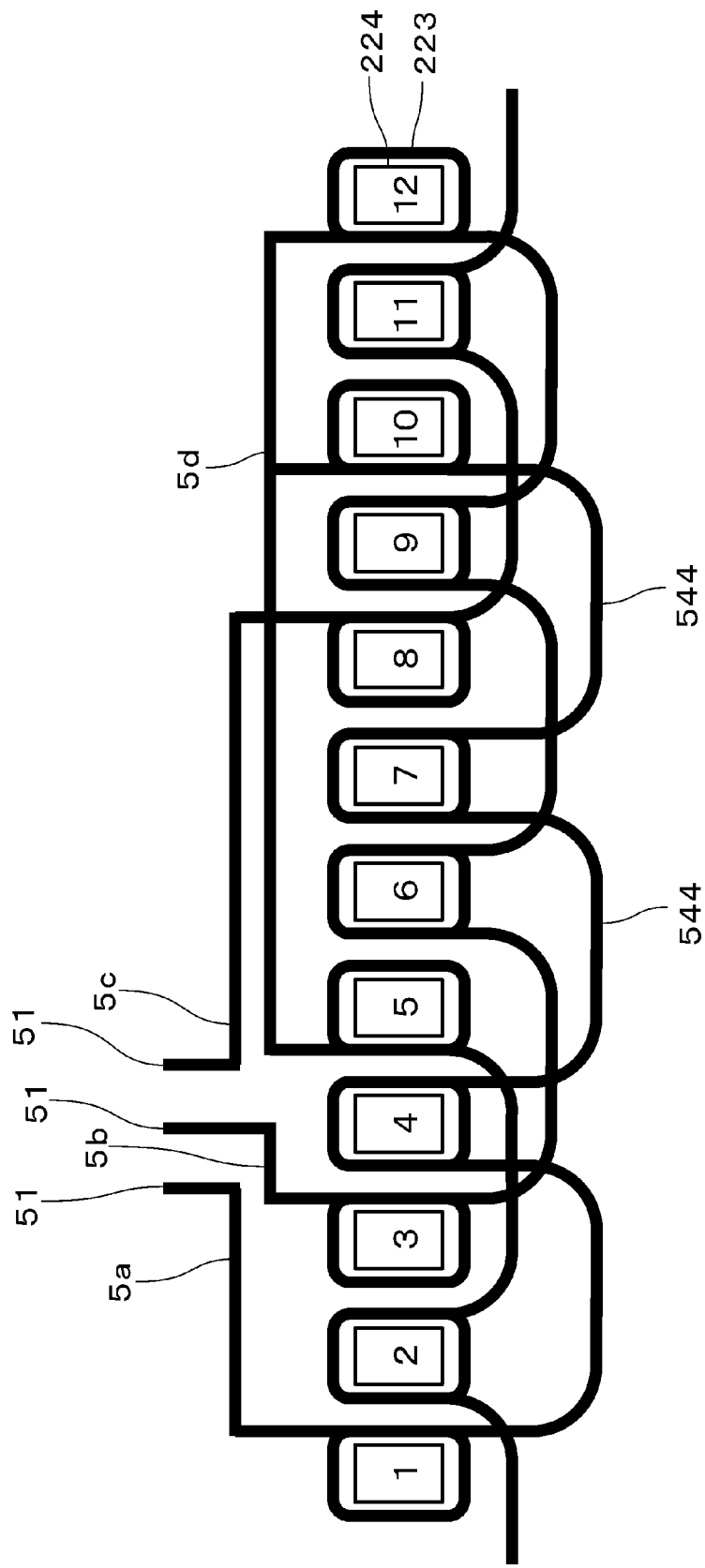
FIG. 14 is a view showing the connection relationship between the bus bar and the coil.
Figure 15:
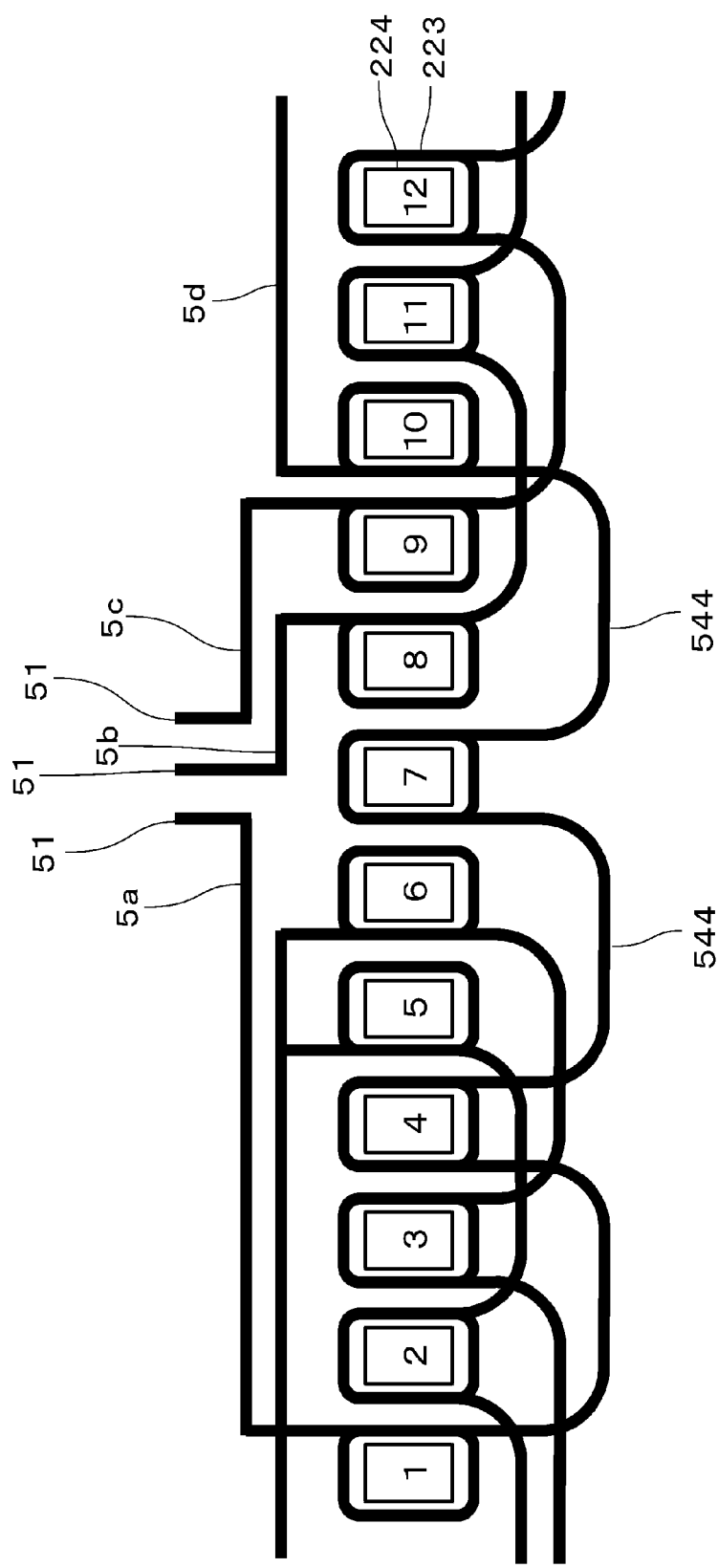
FIG. 15 is a view showing the connection relationship between the bus bar and the coil.

FIG. 11 is a view showing a state where the conducting wire is wound around the teeth 224. Twelve teeth 224 are denoted by reference numerals 1 to 12. In FIG. 11, the upper sides of the teeth 224 show connection by the bus bars. The lower sides of the teeth 224 show connection by jumper wires 544. Twelve coils 223 are configured of three coil groups. Each coil group includes four coils 223 defined by a single conducting wire which includes the jumper wire 544. Each of the internal connection terminals 52 and 53 is connected to either one of the coil groups. As shown in FIG. 1, the jumper wire 544 is disposed on the outer circumferential surface of a lower portion of the insulator 222.

An end portion on one side of a first conducting wire 541 is connected to the internal connection terminal 52 of the first bus bar 5a. The first conducting wire 541 is preferably wound around the number 1, number 4, number 7, and number 10 teeth 224 in sequence. All winding directions of the conducting wire are the same and the same applies to the other teeth 224. The portion of the first conducting wire 541 between the teeth 224 defines and functions as the jumper wire 544. An end portion on the other side of the first conducting wire 541 which is drawn out from the number 10 tooth of the teeth 224 is connected to the internal connection terminal 53 of the second bus bar 5d.

An end portion on one side of a second conducting wire 542 is connected to the internal connection terminal 52 of the first bus bar 5b. The second conducting wire 542 is preferably wound around the number 5, number 8, number 11, and number 2 teeth 224 in sequence. The portion of the second conducting wire 542 between the teeth 224 defines and functions as the jumper wire 544. An end portion on the other side of the second conducting wire 542 which is drawn out from the number 2 tooth of the teeth 224 is connected to the internal connection terminal 53 of the second bus bar 5d.

An end portion on one side of a third conducting wire 543 is connected to the internal connection terminal 52 of the first bus bar 5c. The third conducting wire 543 is preferably wound around the number 6, number 9, number 12, and number 3 teeth 224 in sequence. The portion of the third conducting wire 543 between the teeth 224 defines and functions as the jumper wire 544. An end portion on the other side of the third conducting wire 543 which is drawn out from the number 3 tooth of the teeth 224 is connected to the internal connection terminal 53 of the second bus bar 5d.

The external connection terminal 51 of the first bus bar 5a is preferably located in the vicinity of a slot between the number 3 tooth of the teeth 224 and the number 4 tooth of the teeth 224 in the circumferential direction. The external connection terminal 51 of the first bus bar 5b is located in the vicinity of the number 4 tooth of the teeth 224 in the circumferential direction. The external connection terminal 51 of the first bus bar 5c is preferably located in the vicinity of a slot between the number 4 tooth of the teeth 224 and the number 5 tooth of the teeth 224 in the circumferential direction.

As described previously, the bus bars overlap in only the axial direction in the resin holder 231. As shown in FIG. 11, the maximum number of bus bars which overlap is 2. In this way, the amount of conductive material used is reduced and the axial height of the motor 1 is reduced. Further, the number of bus bars can be set to 4, for example, by using the jumper wires 544. Since the number of bus bar members is small, the structure of the bus bar member 23 is greatly simplified. A mold for the resin holder 231 is also simplified. Since the jumper wires 544 are located at a lower portion of the stator 22, it is not necessary to perform welding work at a place where the jumper wire is routed at the time of assembly, and thus workability is improved.

In the case of the connection form shown in FIG. 11, all connection places of the three first bus bars 5a, 5b, and 5c and the first conducting wire 541, the second conducting wire 542, and the third conducting wire 543, that is, all connection places of the first bus bars and the three coil groups are separated from any of the three external connection terminals 51 by one or more angle pitches of the plurality of teeth 224 in the circumferential direction. In addition, all connection places of the second bus bar 5d and the first conducting wire 541, the second conducting wire 542, and the third conducting wire 543, that is, all connection places of the second bus bar 5d and the three coil groups are preferably separated from any of the three external connection terminals 51 by one or more angle pitches of the plurality of teeth 224 in the circumferential direction. In this way, the external connection terminals 51 do not become obstacles at the time of connection of the bus bars and the conducting wires, and thus connection work of the bus bars and the conducting wires is easily performed.

In the connection example of FIG. 11, the two first bus bars 5b and 5c overlap in the axial direction and the remaining first bus bar 5a and the second bus bar 5d overlap in the axial direction. In the overlap in the axial direction of the bus bars, the number of bus bars is 2. Any other overlapping, except for the above-described overlap of the bus bars, is not present. The same applies to FIGS. 12 to 17 which will be described later. By making an overlap state of the bus bars in this manner, the degree of freedom of disposition of the first bus bar 5a and the second bus bar 5d is increased. As a result, separating both the internal connection terminals 52 and 53 from the external connection terminal 51 by one or more angle pitches of the teeth 224 is easily realized.

As shown in FIG. 4, the outer circumferential surface of the core back 225 preferably includes grooves 228 extending in the axial direction. A groove extending in the axial direction is also provided in the inner circumferential surface of the housing 21. The stator portion 20 is preferably fixed to the inside of the housing 21 by, for example, shrink fitting. At the time of shrink fitting, one of the grooves 228 of the core back 225 and the groove of the housing 21 are overlapped in the radial direction and a pin is inserted in between these grooves. In this way, positioning in the circumferential direction of the stator 22 with respect to the housing 21 is performed. The position in the circumferential direction of the groove 228 which is used in the positioning of the stator 22 is located in a range in the circumferential direction, in which the jumper wire 544 is not present. Due to such disposition of the pin, damage to the jumper wire 544 by the pin at the time of assembly of the motor 1 is prevented.

FIGS. 12 to 15 are diagrams showing other examples of the connection relationship between the bus bar and the coil 223 in accordance with preferred embodiments of the present invention. The structure of the motor 1, except for the connection relationship, is preferably the same as that in FIG. 1. In all the other examples, in the same manner as in FIG. 11, the three first bus bars 5a, 5b, and 5c and the single second bus bar 5d are preferably provided in the bus bar member 23. The number of conducting wires is 3 and the coil group and the jumper wire 544 are defined by each conducting wire. The number of teeth 224 is 12 and a single coil group preferably four coils 223, for example. The external connection terminals 51 of the three first bus bars 5a, 5b, and 5c are disposed to be collected in one area in the circumferential direction. The bus bars only overlap in the axial direction and the maximum number of overlapping bus bars is preferably 2.

With such a structure, the amount of conductive material used is reduced and the axial height of the motor 1 is reduced. Further, since the number of bus bar members is small, the structure of the bus bar member 23 is simplified. Since the jumper wires 544 are located at a lower portion of the stator 22, it is not necessary to perform welding work at a place where the jumper wire is routed at the time of assembly, and thus workability is improved.

Figure 16:
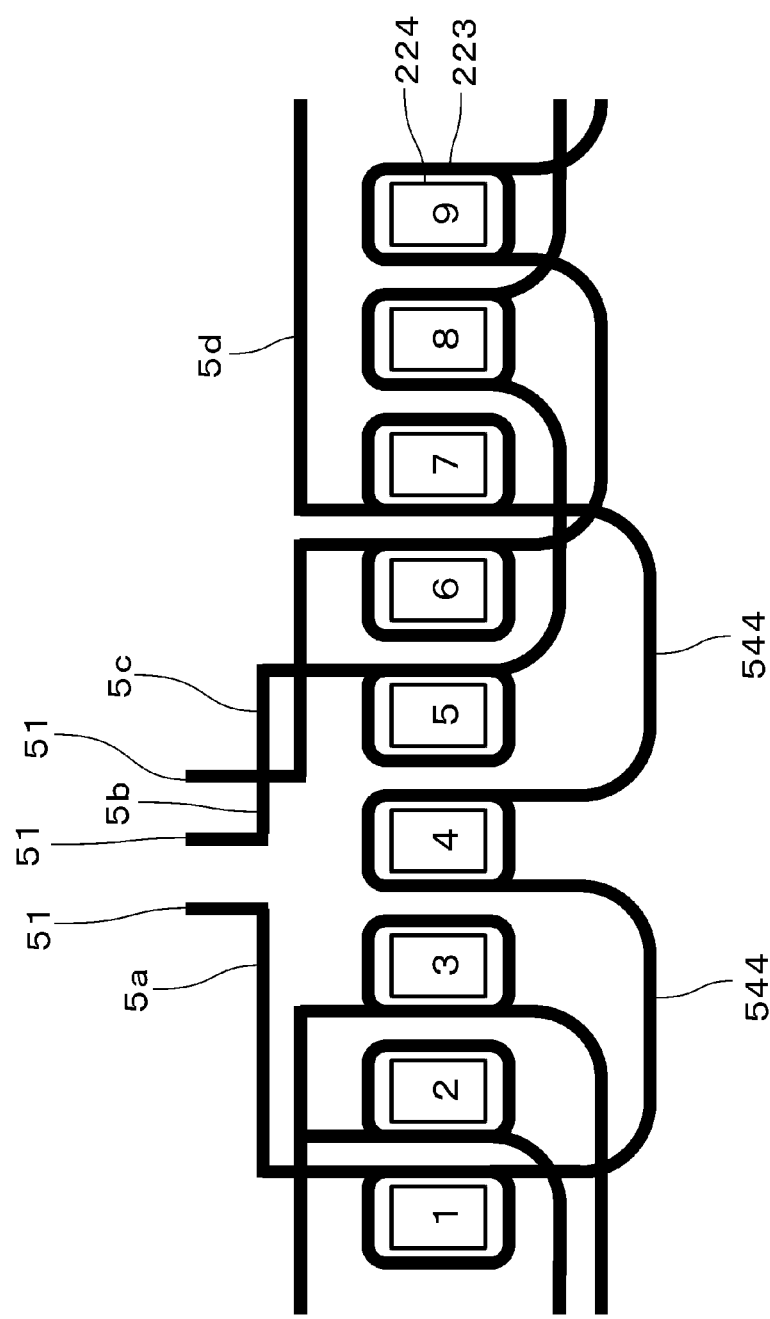
FIG. 16 is a view showing the connection relationship between the bus bar and the coil.

FIG. 16 is a view showing an example of the connection relationship between the bus bar and the coil 223 in a case where the number of teeth 224 is 9, for example. Also in FIG. 16, the three first bus bars 5a, 5b, and 5c and the single second bus bar 5d are preferably provided, for example. The number of conducting wires preferably is 3 and the coil group and the jumper wire 544 are defined by each conducting wire. A single coil group preferably includes three coils 223, for example. The external connection terminals 51 of the three first bus bars 5a, 5b, and 5c are disposed to be collected in one area in the circumferential direction. The bus bars only overlap in the axial direction and the maximum number of overlapping bus bars is preferably 2, for example.

Figure 17:
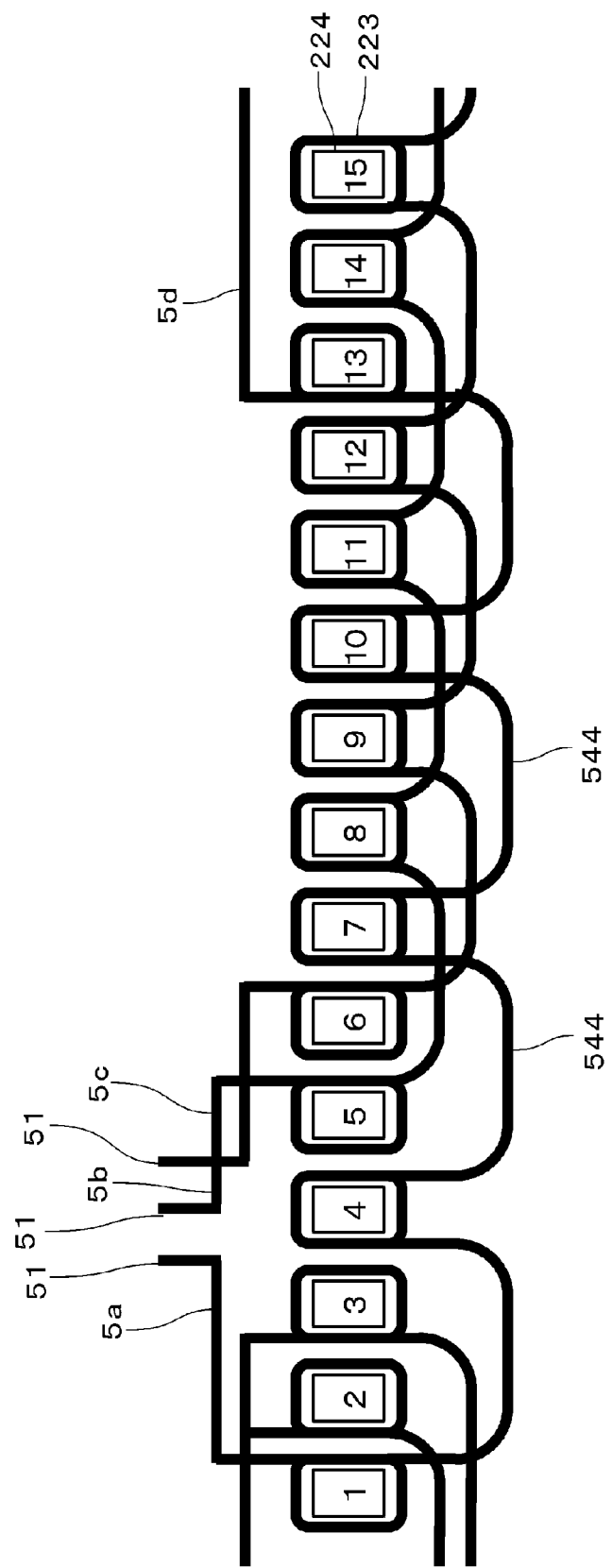
FIG. 17 is a view showing the connection relationship between the bus bar and the coil.

FIG. 17 is a view showing an example of the connection relationship between the bus bar and the coil 223 in a case where the number of teeth 224 is 15. Also in FIG. 17, the three first bus bars 5a, 5b, and 5c and the single second bus bar 5d are provided. The number of conducting wires preferably is 3 and the coil group and the jumper wire 544 are defined by each conducting wire. A single coil group preferably includes five coils 223, for example. The external connection terminals 51 of the three first bus bars 5a, 5b, and 5c are disposed to be collected in one area in the circumferential direction. The bus bars only overlap in the axial direction and the maximum number of overlapping bus bars is preferably 2, for example.

Also in the cases of FIGS. 16 and 17, the axial height of the motor 1 is reduced. Further, since the number of bus bars preferably is 4, the structure of the bus bar member 23 is simplified. Since the jumper wires 544 are located at a lower portion of the stator 22, workability at the time of assembly is improved. As described above, if the number of coils in the coil group which is defined by a single conducting wire is 2 or more, various changes are possible.

Figure 18:
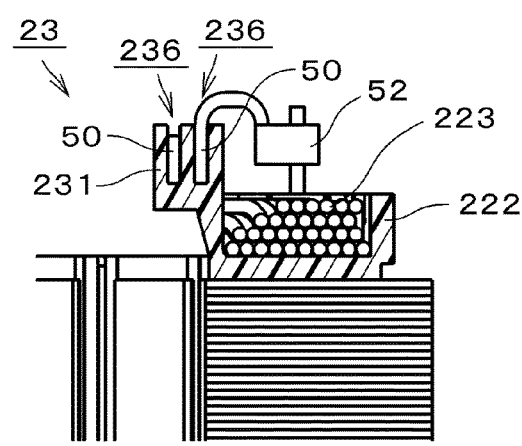
FIG. 18 is a view showing another example of a bus bar member according to a preferred embodiment of the present invention.

FIG. 18 is a view showing another example of the bus bar member 23. In the bus bar member 23 of FIG. 18, a portion of a member configuring the insulator 222 defines and functions as the resin holder 231. That is, the insulator 222 and the resin holder 231 are provided as a single monolithic member by, for example, resin injection molding. The resin holder 231 includes two longitudinal grooves 236 which are arranged in the radial direction. The two longitudinal grooves 236 are concentric. The bus bar is inserted in the longitudinal groove 236.

The number of bus bars is preferably 4 and the connection relationship between the bus bar and the coil 223 is the same as that in FIG. 11. That is, the bus bar is preferably configured of three first bus bars and a single second bus bar. Further, the maximum number of overlaps of the bus bars in the radial direction preferably is 2, for example. The bus bars overlap in only the radial direction. The bus bar main body 50 preferably has a strip shape in which a normal line is directed in the radial direction and which extends in the circumferential direction. The bus bar main body 50 is inserted in the longitudinal groove 236, thus being retained by the resin holder 231. The connection relationship between the bus bar and the coil 223 may be changed as illustrated in FIGS. 12 to 15.

In addition, in the bus bar member 23 shown in FIG. 5, the bus bars may overlap in only the radial direction, and in the example shown in FIG. 18, the bus bars may overlap in only the axial direction.

Preferred embodiments of the present invention have been described above. However, the present invention is not limited to the above-described preferred embodiments and various changes and modifications are possible.

For example, the bus bar member 23 may be mounted on the stator core 221. The bus bar member 23 may also be fixed to the stator 22 by press fitting or adhesion to the insulator 222.

If the jumper wire 544 preferably is located at a lower portion of the stator 22, however, the jumper wire 544 may be disposed at a location other than the outer circumferential surface of the insulator 222.

The structures of the first snap-fit portion 264 and the second snap-fit portion 235 may be changed in various ways. For example, a portion which is elastically deformed may be provided in any of the insulator 222, the resin holder 231, and the cap 24 and may also be provided in all of them.

The motor 1 may be used as a drive source other than the oil pump. Since the bus bar member 23 is provided, such that reliability is high and durability is excellent even in large vibration, the motor 1 is particularly suitable for vehicle mounting.

The configurations in the preferred embodiments and each modified example described above may be appropriately combined unless they are inconsistent with each other.

The various preferred embodiments of the present invention can be used in motors of various uses.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A stator portion assembly comprising:
a stator has a central axis extends in a vertical direction; and
a bus bar member disposed on an upper side of the stator; wherein the stator includes:
a core back centered on the central axis;
a plurality of teeth extending toward the central axis from the core back;
and a plurality of coils respectively provided on the plurality of teeth;
the plurality of coils define three coil groups; each of the three coil groups includes two or more coils defined by a single conducting wire that includes a jumper wire portion;
the bus bar member includes:
three first bus bars, wherein end portions on one side of the conducting wires of the three coil groups are respectively connected to the three first bus bars, and each of the three first bus bars includes an external connection terminal;
a second bus bar that defines a neutral point, wherein end portions on the other side of the conducting wires of the three coil groups are connected to the neutral point; and
a resin holder that retains the three first bus bars and the second bus bar;
the external connection terminals of the three first bus bars are disposed in a common area of a circumferential direction centered on the central axis; and
the three first bus bars and the second bus bar overlap in only one of a radial direction centered on the central axis and an axial direction, and a maximum number of the three first bus bars and the second bus bar that overlap is 2.

2. The stator portion according to claim 1, wherein two of the three first bus bars overlap in the radial direction or the axial direction, and a remaining one of the first bus bars overlaps in the radial direction or the axial direction with the second bus bar.

3. The stator portion according to claim 2, wherein all connection locations of the three first bus bars and the three coil groups and all connection locations of the second bus bar and the three coil groups are separated from any of the external connection terminals of the three first bus bars by one or more angle pitches of the plurality of teeth in the circumferential direction.

4. The stator portion according to claim 1, wherein the plurality of teeth includes a total of 12 teeth.

5. The stator portion according to claim 1, wherein the jumper wire portion is located at a lower portion of the stator.

6. The stator portion according to claim 5, wherein an outer circumferential surface of the core back includes a groove extending in the axial direction; the groove is configured to position the core back in the circumferential direction of the stator; and a position in the circumferential direction of the groove is located in a range in the circumferential direction, wherein the jumper wire portion is not present in the position in the circumferential direction of the groove.

7. The stator portion according to claim 1, wherein the resin holder is disposed around the three first bus bars and the second bus bar such that the three first bus bars and the second bus bar are at least partially encapsulated by the resin holder.

8. The stator portion according to claim 1, further comprising a cap that is disposed on an upper side of the bus bar member; wherein the resin holder has an annular shape;
an outer peripheral portion of the resin holder includes a first snap-fit portion that protrudes downward and is engaged with the stator; and
an inner peripheral portion of the resin holder includes a second snap-fit portion that is engaged with the cap.

9. The stator portion according to claim 1, wherein
the three first bus bars and the second bus bar overlap in the axial direction;
each of the three first bus bars and the second bus bar includes:
an internal connection terminal that is connected to any of the three coil groups;
a bus bar main body; and
a support portion that extends radially outward from the bus bar main body and reaches the internal connection terminal; and
the support portion of the bus bar on the upper side is directed downward at least one time on the way from the bus bar main body to the internal connection terminal.

10. A motor comprising:
the stator portion according to claim 1;
a rotating portion that is disposed inside the stator;
a bearing portion supporting the rotating portion so as to be able to rotate around the central axis; and
a housing retaining the stator portion inside.

* * * * *